United States Patent
Matsui

(10) Patent No.: US 8,977,957 B2
(45) Date of Patent: Mar. 10, 2015

(54) IMAGE PROCESSING APPARATUS FOR DISPLAYING A PREVIEW IMAGE INCLUDING FIRST AND SECOND OBJECTS ANALYZED WITH DIFFERENT DEGREES OF ANALYSIS PRECISION AND METHOD OF CONTROLLING THE APPARATUS

(75) Inventor: Kenta Matsui, Inagi (JP)

(73) Assignee: Canon Kabushiki Kaisha, Tokyo (JP)

(*) Notice: Subject to any disclaimer, the term of this patent is extended or adjusted under 35 U.S.C. 154(b) by 63 days.

(21) Appl. No.: 12/850,339

(22) Filed: Aug. 4, 2010

(65) Prior Publication Data
US 2011/0055694 A1    Mar. 3, 2011

(30) Foreign Application Priority Data

Sep. 3, 2009 (JP) ................................ 2009-204135

(51) Int. Cl.
G06F 17/00 (2006.01)
G06K 15/02 (2006.01)
G06K 15/00 (2006.01)

(52) U.S. Cl.
CPC .............. *G06K 15/02* (2013.01); *G06K 15/005* (2013.01); *G06K 15/1801* (2013.01); *G06K 15/1817* (2013.01)
USPC ........... 715/274; 715/273; 715/275; 715/276; 715/277

(58) Field of Classification Search
CPC ....................................................... G06F 17/212
USPC .................................................. 715/273–277
See application file for complete search history.

(56) References Cited

U.S. PATENT DOCUMENTS

| | | | |
|---|---|---|---|
| 5,652,663 A * | 7/1997 | Zelten ........................... | 358/447 |
| 6,654,509 B2 | 11/2003 | Nishikawa et al. | |
| 6,751,780 B1 * | 6/2004 | Neff et al. ..................... | 715/247 |
| 6,757,081 B1 * | 6/2004 | Fan et al. ...................... | 358/474 |
| 7,809,300 B2 | 10/2010 | Saeki et al. ..................... | 399/82 |
| 2002/0085243 A1 * | 7/2002 | Kanatsu ........................ | 358/453 |
| 2003/0202716 A1 | 10/2003 | Nishikawa et al. | |
| 2004/0086156 A1 * | 5/2004 | Furukawa et al. ............ | 382/112 |
| 2007/0140723 A1 | 6/2007 | Saeki et al. ..................... | 399/82 |
| 2009/0110288 A1 * | 4/2009 | Fujiwara ....................... | 382/190 |
| 2009/0161174 A1 * | 6/2009 | Takeuchi et al. .............. | 358/474 |

(Continued)

FOREIGN PATENT DOCUMENTS

JP  2000-83161 A   3/2000
JP  2007-188054 A  7/2007

OTHER PUBLICATIONS

IBM, Application-based printer-generated print prview, Apr. 7, 2001, IBM Technical Database and ip.com Prior Art Database, pp. 1-2. Retrieved from http://www.ip.com/pubview/IPCOM000013647D.*
Keni Bernardin and Rainer Stiefelhagen, "Evaluating Multiple Object Tracking Performance: The CLEAR MOT Metrics", vol. 2008, Hindawi Publishing Corporation, 10 pages.*

(Continued)

*Primary Examiner* — Chau Nguyen
(74) *Attorney, Agent, or Firm* — Fitzpatrick, Cella, Harper & Scinto

(57) ABSTRACT

An image processing apparatus displays a preview image of an input job and a method controls the apparatus. The apparatus determines an attribute of an object included in an input job, analyzes the job while switching the degree of the precision of analysis of the job based on a user-specified display size and the attribute of the object, and generates and displays a preview image of the job based on the analysis results.

7 Claims, 16 Drawing Sheets

(56) References Cited

U.S. PATENT DOCUMENTS

| | | |
|---|---|---|
| 2010/0054598 A1* | 3/2010 | Gotoh .......................... 382/173 |
| 2010/0058180 A1* | 3/2010 | Hirayama et al. ............ 715/274 |
| 2010/0218093 A1* | 8/2010 | Sakamoto .................... 715/274 |
| 2010/0238286 A1* | 9/2010 | Boghossian et al. .......... 348/143 |
| 2011/0078566 A1* | 3/2011 | Robertz ....................... 715/274 |

OTHER PUBLICATIONS

Kahmen Heribert and Reiterer Alexander, "High-Precision Object Monitoring with Image Assisted Theodolites—State of the Art", Oct. 4-7, IWAA204, CERN, Geneva, 11 pages.*

Japanese Office Action dated Sep. 13, 2013, issued in counterpart Japanese Application No. 2009-204135.

* cited by examiner

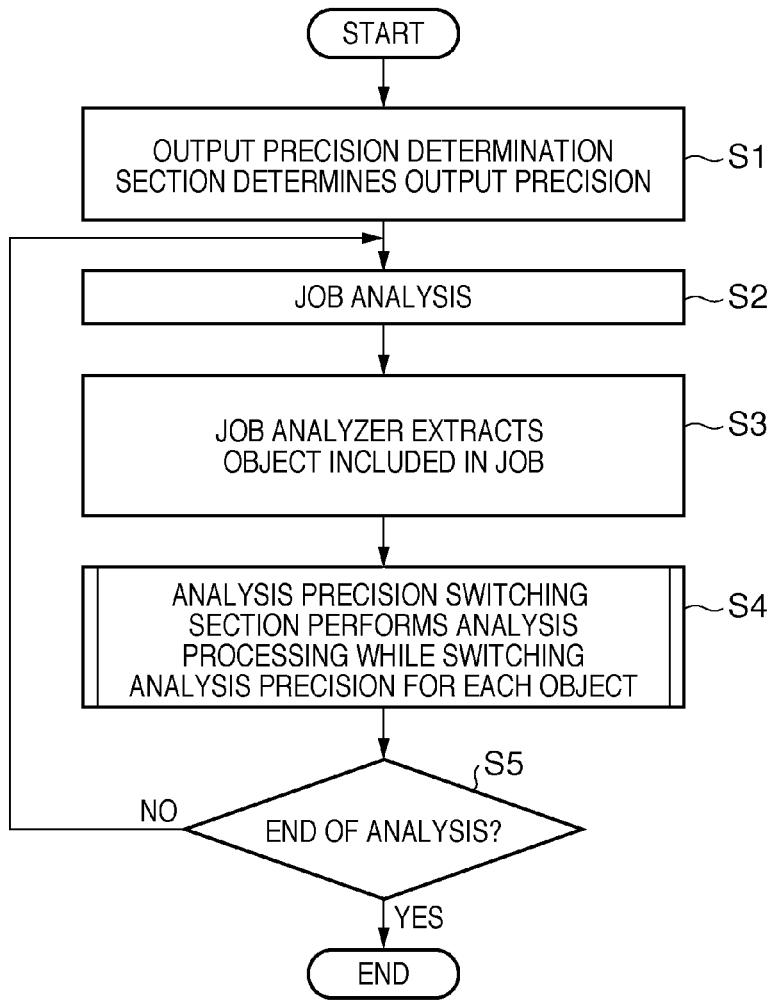

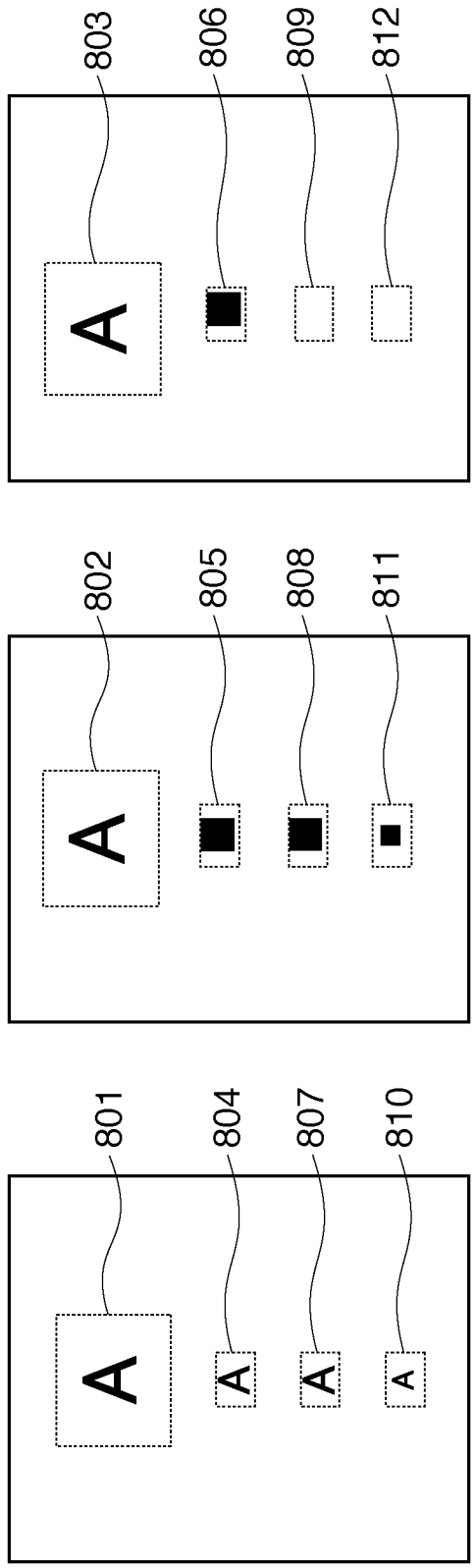

FIG. 10

| Level1 | Level2 | Level3 |
|---|---|---|
| ☆ | ☐ | ▫ |

IMAGE PROCESSING APPARATUS FOR DISPLAYING A PREVIEW IMAGE INCLUDING FIRST AND SECOND OBJECTS ANALYZED WITH DIFFERENT DEGREES OF ANALYSIS PRECISION AND METHOD OF CONTROLLING THE APPARATUS

BACKGROUND OF THE INVENTION

1. Field of the Invention

The present invention relates to an image processing apparatus that analyzes an object in an input job and a method of controlling the apparatus.

2. Description of the Related Art

Printers capable of displaying a preview image of an input print job have been conventionally proposed, and such printers display a preview image using sample image data that has been prepared in advance. Specifically, a printer selects an optimum sample image from among prepared multiple sample images according to the characteristics of an image included in an input print job and displays the selected sample image as a provisional preview image. This reduces the load on the CPU of the printer and enables quick display of a preview image (see Japanese Patent Laid-Open No. 2007-188054).

However, the aforementioned conventional preview image is merely one sample image and not a preview image corresponding to the input print job. It is thus desired that a preview image corresponding to an input job be displayed.

Also, conventionally, only an input job that includes image data in a scanner readable format has been treated as a job to be previewed. However, input jobs may also be in various other formats. Examples of such input jobs include PDL (page description language) jobs in PDL format, jobs in XPS or PDF format or the like, and scan jobs of correcting, editing, and modifying a scanned image. Consider the case where such various input jobs are stored in an HDD of a printer and preview images corresponding to the input jobs are displayed on a user interface (UI) screen of the printer body. To generate preview images from such various input jobs at high speed, it is necessary to either omit or simplify part of complicated interpretation processing and rendering processing. However, omission or simplification of the processing could lead to the problem that information that the user wants to confirm may not be displayed as a preview image.

SUMMARY OF THE INVENTION

An aspect of the present invention is to eliminate the above-mentioned problems with the conventional technology.

A feature of the present invention is to provide a technique for generating and displaying a preview image that reliably contains information that the user wants to confirm.

According to an aspect of the present invention, there is provided an image processing apparatus comprising: an obtaining unit that obtains a user-specified display size of a preview image; a determination unit that determines an attribute of an object included in a job; an analysis unit that analyzes the object while switching the degree of analysis precision, based on the display size obtained by the obtaining unit and the attribute of the object determined by the determination unit; and a preview image generation unit that generates preview image data regarding the job, based on analysis results analyzed by the analysis unit.

According to another aspect of the present invention, there is provided a method of controlling an image processing apparatus for analyzing an object in a job, comprising: an obtaining step of obtaining a user-specified display size of a preview image; a determination step of determining the attribute of an object included in the job; an analysis step of analyzing the object while switching the degree of analysis precision, based on the display size obtained in the obtaining step and the attribute of the object determined in the determination step; and a preview image generation step of generating preview image data regarding the job, based on the analysis results analyzed in the analysis step.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a flowchart describing the processing performed by a job analyzer according to the first embodiment.

FIG. 6 is a diagram illustrating the precision of analysis by the job analyzer according to the embodiment of the present invention.

FIGS. 8A to 8C depict views illustrating example images displayed as preview images according to the first embodiment.

FIG. 10 is a diagram illustrating the precision of analysis by a job analyzer according to a second embodiment.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
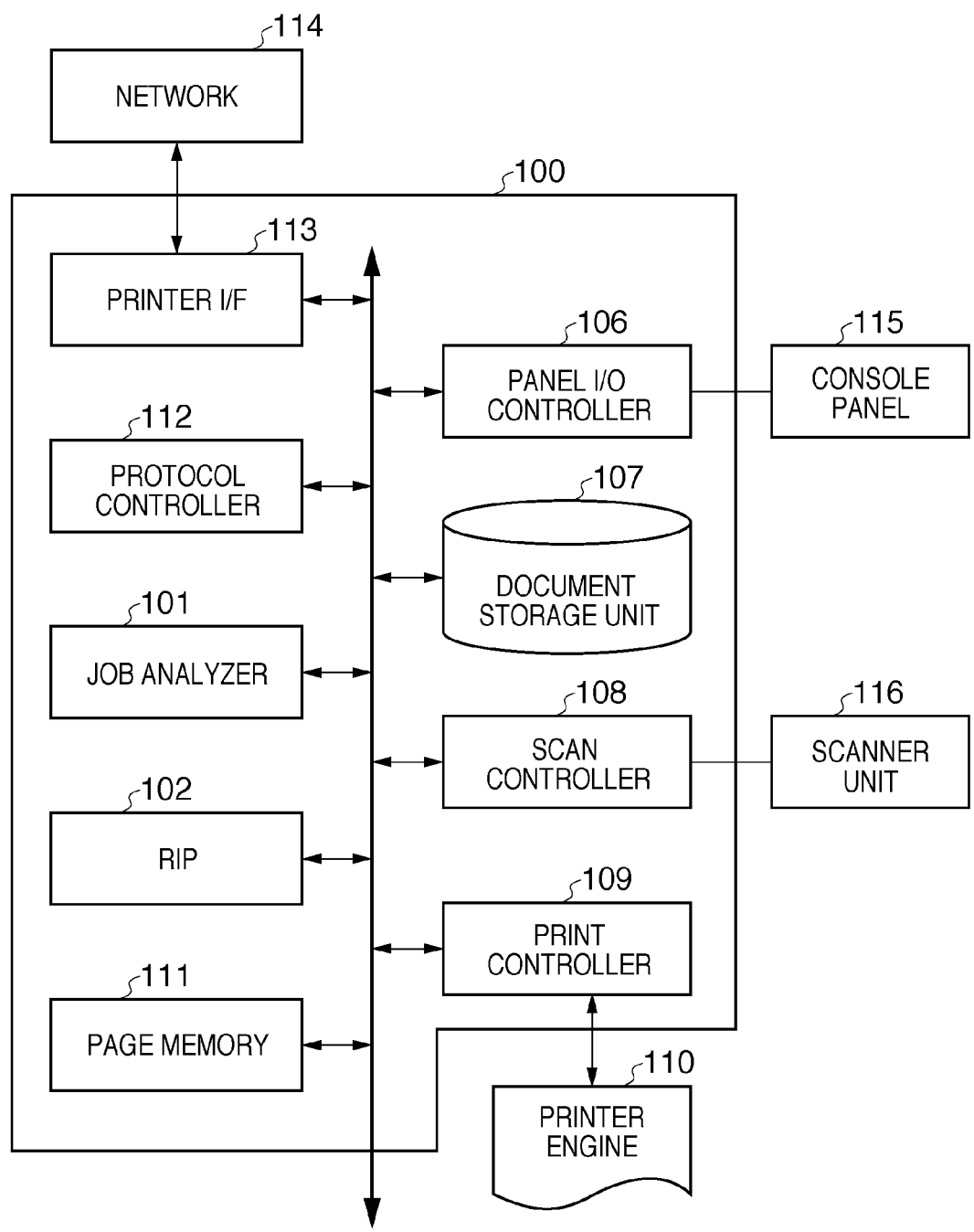
FIG. 1 is a block diagram illustrating a functional configuration of a controller that controls the operation of a printer according to an embodiment of the present invention.

FIG. 1 is a block diagram describing a functional configuration of a controller 100 that controls the operation of a printer according to a first embodiment of the present invention. This printer includes a scanner unit 116, and a description is given of a case where the printer is a multifunction peripheral (MFP) capable of communicating with external devices on a network, for example. Part of the functional configuration of the controller 100 is implemented by the CPU of the controller 100 executing a control program.

A printer interface 113 inputs and outputs data from and to external devices on a network 114. A protocol controller 112 analyzes a network protocol and communicates with external devices with the network protocol. A job analyzer 101 analyzes data in an input job (hereinafter simply referred to as a "job"), such as a PDL job and a scan job, and converts the job into intermediate data whose format is easy to process in a raster image processor (RIP) 102. The intermediate data generated by the job analyzer 101 is transmitted to and processed by the RIP 102. The RIP 102 develops the intermediate data into raster image data and stores the developed image data into a page memory 111. The page memory 111 is a volatile memory that temporarily stores raster image data that has been developed by the RIP 102.

A panel I/O controller 106 inputs information manipulated from a console panel 115 and outputs display data to the console panel 115. A document storage unit 107 stores jobs such as PDL jobs and scan jobs on a job-by-job basis and is implemented by a secondary storage unit such as a hard disk (HDD). The storing of jobs in the document storage unit 107 enables the user to retrieve and output (print) the jobs repeatedly at any time. A scan controller 108 performs various processing such as correction, modification, and editing on image data that has been input from the scanner unit 116. A print controller 109 performs printing by converting the contents of the page memory 111 into print data and outputting the print data to a printer engine 110. The printer engine 110 forms a visible image on recording paper (a recording medium such as a sheet of paper) according to the print data.

Figure 2:
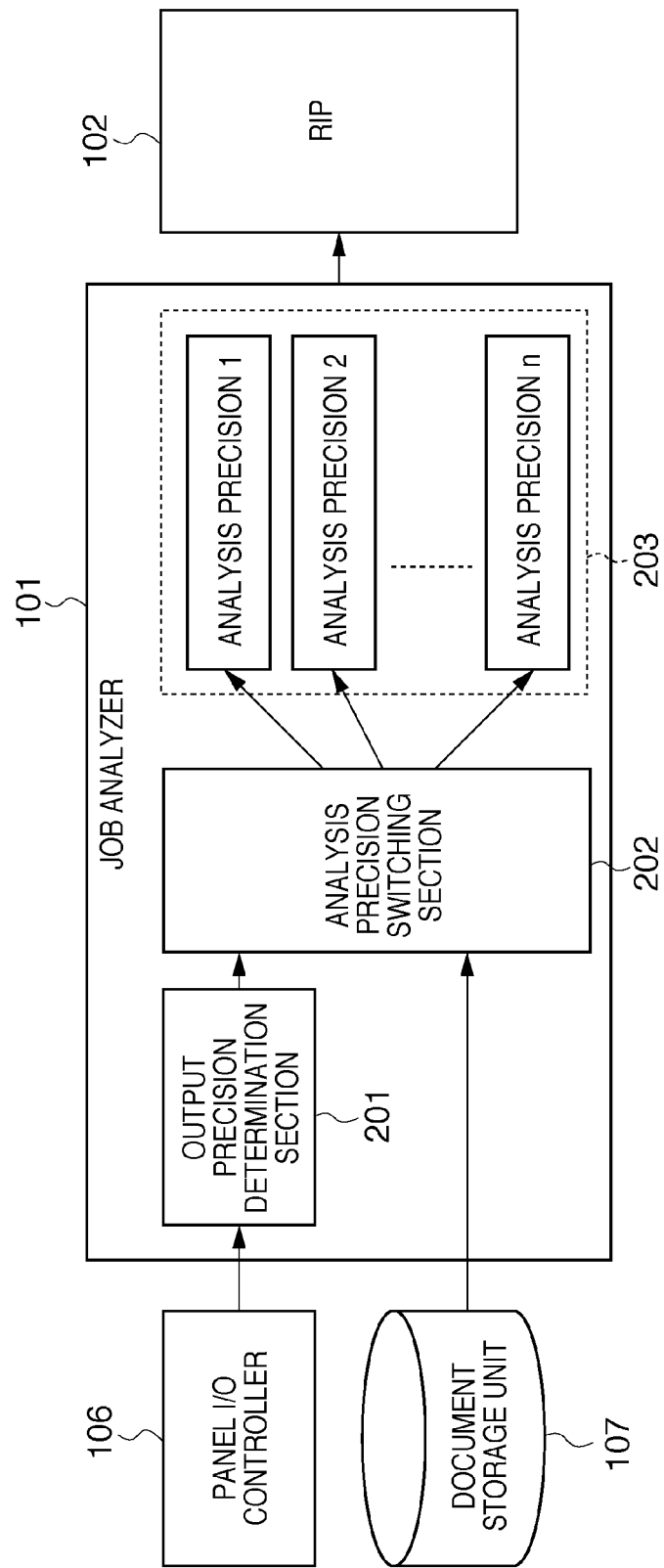
FIG. 2 is a functional block diagram describing the function of a job analyzer according to the embodiment of the present invention.

FIG. 2 is a functional block diagram describing the function of the job analyzer 101 according to the first embodiment, where common parts to those in FIG. 1 are denoted by the same reference numerals and have not been described.

An output precision determination section 201 acquires user-specified display-size information regarding a preview image from the panel I/O controller 106 and determines the output precision (described later) at the time of preview display based on the information. An analysis precision switching section 202 switches the degree (1 to n) of analysis precision 203 at the time of analyzing a job according to the determination results obtained by the output precision determination section 201 and objects constituting the job. Next, the output precision according to the first embodiment will be described with reference to FIGS. 3A to 3C.

Figure 3C:
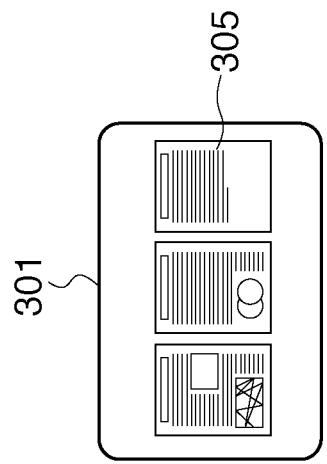
FIGS. 3A to 3C depict views describing the precision with which preview images are output according to a first embodiment.
Figure 3B:
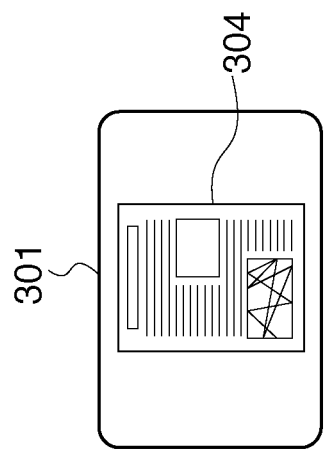
Figure 3A:
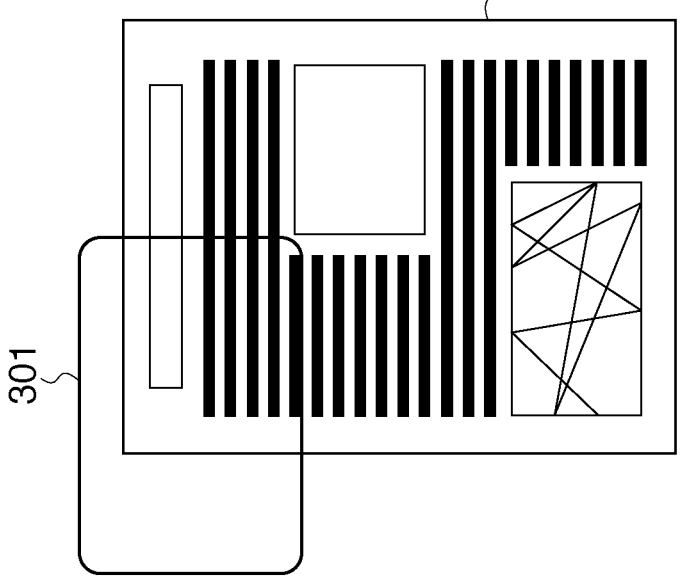

FIGS. 3A to 3C depicts views describing the precision with which preview images displayed on the console panel 115 are output according to the first embodiment. Three types of preview images are shown in FIGS. 3A to 3C.

A display panel 301 is provided on the console panel 115 and is capable of displaying a preview image. In the first embodiment, the output precision in a case where a large-size preview image 303, such as the enlarged display in FIG. 3A, is required is described as a display in which the "display size is large". Also, the output precision in a case where a small-size preview image 305, such as the thumbnail displayed in FIG. 3C, is required is described as a display in which the "display size is small". Further, the precision with which a preview image 304 having an intermediate size between the above two images, as shown in FIG. 3B, is output is described as a display in which the "display size is medium".

Figure 4:
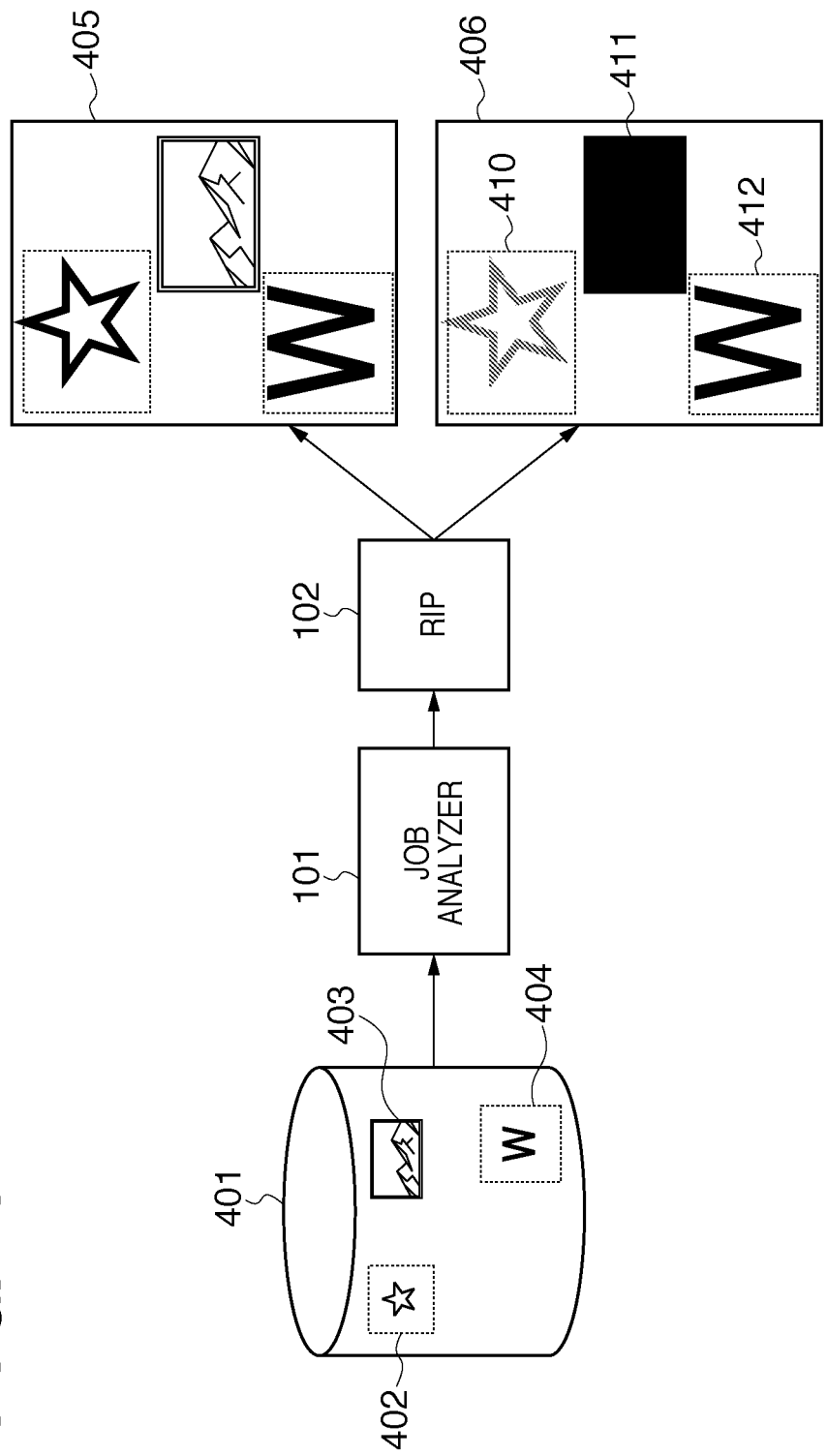
FIG. 4 is a diagram describing job attributes.

FIG. 4 is a diagram describing job attributes.

An input job 401 includes objects 402, 403, and 404. Each object has an attribute attached thereto by an application or the user. For example, the object 402 has a graphic attribute attached thereto, the object 403 has an image attribute attached thereto, and the object 404 has a character attribute attached thereto. By using such attributes, the RIP 102 can generate attribute information 406 in bitmap format indicating the attribute of each pixel, simultaneously with the generation of raster image data 405. In the present embodiment, the RIP 102 performs preview-image generation processing in which preview image data is generated based on objects that have been analyzed by the job analyzer 101 and a preview image is displayed based on the preview image data. Reference numerals 410 to 412 in the attribute information 406 denote graphic pixels, image pixels, and character pixels, respectively. By referring to the attribute information 406, optimum image processing can be performed on each pixel in the raster image data 405.

FIG. 5 is a flowchart describing the processing performed by the job analyzer 101 according to the first embodiment.

First, the output precision determination section 201 of the job analyzer 101 determines the output precision in step S1. Next, the process proceeds to step S2 where the job analyzer 101 starts the analysis of an input job. The process then proceeds to step S3 where the job analyzer 101 extracts objects included in the job. Then, the process proceeds to step S4 where the analysis precision switching section 202 of the job analyzer 101 performs analysis processing while switching the degree of analysis precision for each object. The details of the processing performed for each object will be described later. Then, the process proceeds to step S5 where the job analyzer 101 determines whether or not the analysis of the job has been completed, and repeats the processing from steps S2 to S5 until the analysis is completed.

Following is a description of the processing in which the job analyzer 101 according to the first embodiment analyzes bitmap objects included in an input job. Note that, in the first embodiment, three levels shown in FIG. 6 are prepared for the degree of the analysis precision 203 switched by the analysis precision switching section 202 in step S4.

FIG. 6 is a diagram describing the degree of the precision of analysis by the job analyzer 101 according to the present embodiment. For convenience sake, three degrees of the analysis precision are referred to respectively as Level 1, Level 2, and Level 3. Here, Level 1 is a level at which the job analyzer 101 analyzes the edge of a bitmapped character "A" so that the character "A" is represented as is as a raster image. Level 2 is a level at which the edge of the character "A" is not analyzed and only the edge of the rectangular bitmap is analyzed so as to represent a black rectangular raster image. Level 3 is a level at which the bitmap is not analyzed and thus nothing appears as a raster image.

Hereinbelow, the processing performed by the job analyzer 101 in which bitmap objects included in a job are analyzed is described with reference to the flowchart of FIG. 7.

Figure 7:
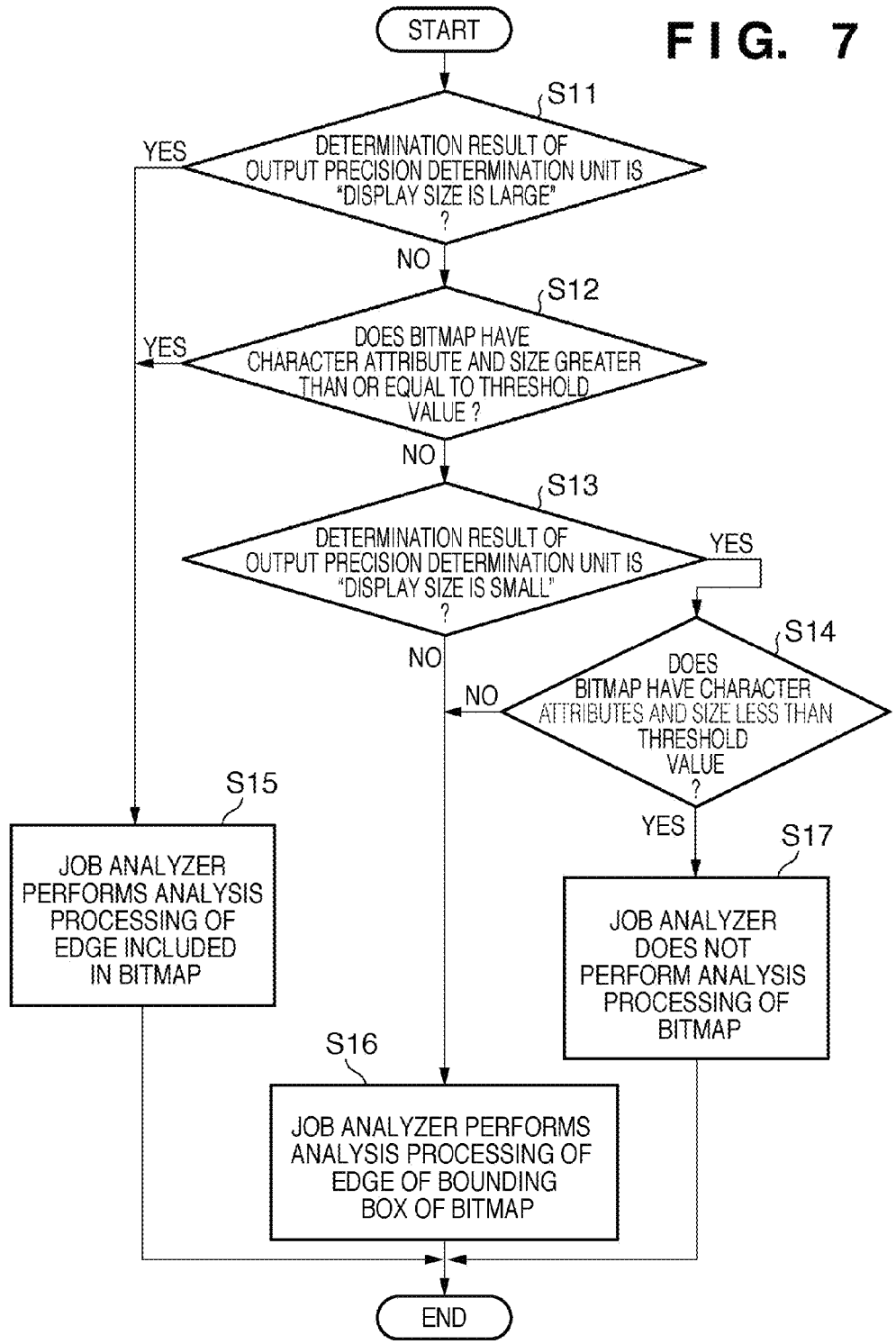
FIG. 7 is a flowchart describing analysis processing performed by the job analyzer according to the first embodiment.

FIG. 7 is a flowchart describing the analysis processing performed by the job analyzer 101 according to the first embodiment.

First, it is determined in step S11 whether or not the determination result obtained by the output precision determination section 201 in step S1 is "display size is large". If it is determined as "display size is large", then the process proceeds to step S15, and otherwise, the process proceeds to step S12. In step S15, the job analyzer 101 performs analysis processing of an edge included in the bitmap (the analysis precision at this time is at Level 1). Meanwhile, in step S12, the job analyzer 101 determines whether or not the object extracted in step S3 in FIG. 5 has a character attribute and an image size greater than or equal to a threshold value. If this is the case, then the process proceeds to step S15 where the aforementioned processing is performed, and otherwise, the process proceeds to step S13. In step S13, it is determined whether or not the determination result obtained by the output precision determination section 201 in step S1 is "display size is small". If so, then the process proceeds to step S14, and otherwise, the process proceeds to step S16. In step S16, the job analyzer 101 performs analysis processing of the edge of a bounding box of the bitmap (the analysis precision at this time is at Level 2). Meanwhile, in step S14, the job analyzer 101 determines whether or not the object extracted in step S3 in FIG. 5 has a character attribute and an image size less than a threshold value. If this is the case, then the process proceeds to step S17, and otherwise, the process proceeds to step S16. In step S17, the job analyzer 101 does not perform analysis processing of the bitmap (the analysis precision at this time is at Level 3).

FIGS. 8A to 8C depict views illustrating examples of raster image data generated at the time of displaying, as a preview image, a job that includes a bitmapped image where the character "A" is rendered, in accordance with the aforementioned procedure of the first embodiment.

Figure 9A:
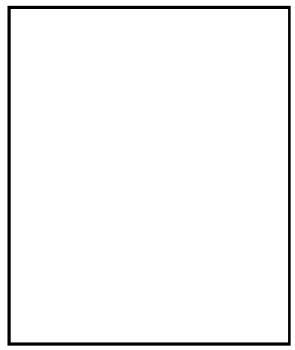
FIGS. 9A to 9C are diagrams illustrating the actual sizes of the preview images.
Figure 9B:
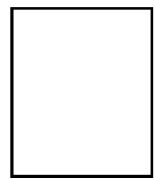
Figure 9C:

FIGS. 8A to 8C show raster image data generated respectively in the cases of "display size is large" (FIG. 8A) (indicated by 303 in FIG. 3A), "display size is medium" (FIG. 8B) (indicated by 304 in FIG. 3B), and "display size is small" (FIG. 8C) (indicated by 305 in FIG. 3C). Although FIGS. 8A to 8C are all shown in the same size for improved readability of the drawings, their actual image sizes differ as shown in FIGS. 9A to 9C.

(1) Case where the bitmapped images respectively corresponding to FIGS. 8A to 8C have a character attribute and an image size greater than or equal to a predetermined threshold value "10".

In the case of FIG. 8A, that is, "display size is large", the process branches to step S15 based on the determination in step S11, so a character "A" is rendered as a raster image 801. In the case of FIG. 8B, that is, "display size is medium", the process proceeds to step S15 based on the determination in step S12 (greater than "10"), so a character "A" is rendered a raster image 802 as shown in FIG. 8B. In the case of FIG. 8C, that is, "display size is small", the process proceeds to step S15 based on the determination in step S12, so a character "A" is rendered as a raster image 803 as shown in FIG. 8C.

(2) Case where the bitmapped images respectively corresponding to FIGS. 8A to 8C have a graphic attribute and an image size greater than a value "3" and less than the threshold value "10".

In the case of "display size is large" in FIG. 8A, the process proceeds to step S15 based on the determination in step S11, so a graphic "A" is rendered as a raster image 804. In the case of "display size is medium" in FIG. 8B, it is determined as NO (less than the threshold value "10") in step S12 and further as NO in step S13 and the process proceeds to step S16, so a rectangle is rendered as a raster image 805. In the case of "display size is small" in FIG. 8C, the process proceeds to step S14 based on the determination in step S13 and then to step S16 since it is determined as NO in step S14. Thus a rectangle is rendered as a raster image 806.

(3) Case where the bitmapped images respectively corresponding to FIGS. 8A to 8C have a character attribute and an image size greater than a value "3" and less than the threshold value "10".

In the case of "display size is large" in FIG. 8A, the process proceeds to step S15 based on the determination in step S11, so a character "A" is rendered as a raster image 807. In the case of "display size is medium" in FIG. 8B, the process proceeds from steps S12 to S13 and then to step S16 since it is determined as not "display size is small", so a rectangle is rendered as a raster image 808. In the case of "display size is small" in FIG. 8C, the process proceeds from steps S13 to S14 and then to step S17 since it is determined as "YES" in step S14, so no raster image is rendered as indicated by 809.

(4) Case where the bitmapped images respectively corresponding to FIGS. 8A to 8C have a character attribute and an image size less than a value "3".

In the case of "display size is large" in FIG. 8A, the process proceeds to step S15 based on the determination in step S11, so a character "A" is rendered as a raster image 810. In the case of "display size is medium" in FIG. 8B, the process proceeds from steps S13 to S16, so a rectangle is rendered as a raster image 811. Also, in the case of "display size is small" in FIG. 8C, the process proceeds to step S17 since it is determined as YES (less than "10") in step S14, so no raster image is rendered as indicated by 812.

As described above, analysis processing can be simplified (Level 2 of the analysis precision) or omitted (Level 3 of the analysis precision) depending on the output precision and the attribute of a bitmapped image. Consequently, it is possible to increase the speed of the analysis processing performed by the job analyzer 101 while maintaining the visibility of a preview display screen, which enables quick generation and display of a preview image that reliably contains information that the user wants to confirm.

Second Embodiment

Next, a description is given of a second embodiment according to the present invention. In the second embodiment, processing is described in which a job analyzer 101 analyzes a path object (a combination of a line and an area surrounded by the line) included in a job. Note that the configuration of the job analyzer 101 and the outline of the processing are the same as described above in the first embodiment with reference to the flowchart of FIG. 5 and thus have not been described here. Additionally, the construction of the control program executed by the printer is also similar to that described above in the first embodiment and thus has not been described. Here, three levels shown in FIG. 10 are prepared for the degrees of the analysis precision 203 switched by an analysis precision switching section 202 according to the second embodiment.

FIG. 10 is a diagram describing the degrees (levels) of the precision of analysis by the job analyzer according to the second embodiment.

Level 1 is a level at which the job analyzer 101 analyzes the edge of an object and the shape of the object appears in the raster image. Level 2 is a level at which the edge of the bounding box is analyzed without analyzing the edge of an object and thus a rectangle appears in the raster image. Level 3 is a level at which an object is not analyzed and thus no shape appears in the raster image.

Next, the processing performed by the job analyzer 101 in which an object included in a job is analyzed is described with reference to the flowchart of FIG. 11.

Figure 11:
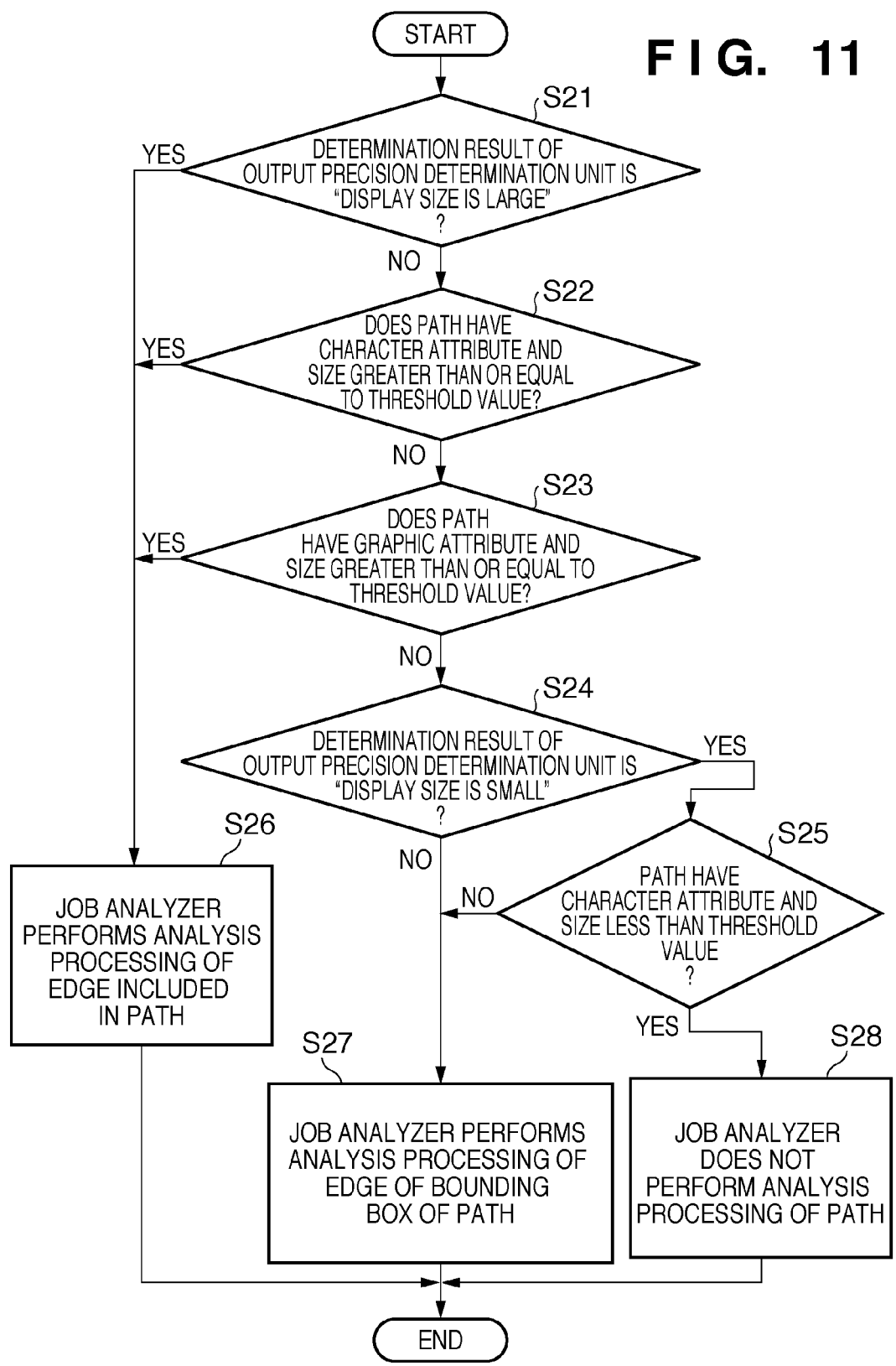
FIG. 11 is a flowchart describing processing performed by the job analyzer according to the second embodiment.

FIG. 11 is a flowchart describing the processing performed by the job analyzer 101 according to the second embodiment.

First, it is determined in step S21 whether or not the determination result obtained by the output precision determination section 201 in step S1 in FIG. 5 is "display size is large". If so, then the process proceeds to step S26, and otherwise, the process proceeds to step S22. In step S26, the job analyzer 101 performs analysis processing of the edge of the path object (the analysis precision is at Level 1 in FIG. 6) and ends the process. Meanwhile, in step S22, the job analyzer 101 determines whether or not the path object extracted in step S3 in FIG. 5 has a character attribute and an image size greater than or equal to a threshold value. If this is the case, then the process proceeds to step S26, and otherwise, the process proceeds to step S23. In step S23, the job analyzer 101 determines whether or not the path object extracted in step S3 in FIG. 5 has a graphic attribute and an image size greater than or equal to the threshold value. If this is the case, then the process proceeds to step S26, and otherwise, the process proceeds to step S24. In step S24, it is determined whether or not the determination result obtained by the output precision determination section 201 in step S1 is "display size is small". If so, then the process proceeds to step S25, and otherwise, the process proceeds to step S27. In step S25, the job analyzer 101 determines whether or not the path object extracted in step S3 in FIG. 5 has a character attribute and an image size less than a threshold value. If this is the case, then the process proceeds to step S28, and otherwise, the process proceeds to step S27. In step S27, the job analyzer 101 performs analysis processing of the edge of a bounding box of the path object (the analysis precision is at Level 2 in FIG. 6) and ends the process. Meanwhile, in step S28, the job analyzer 101 ends the process without performing analysis processing of the path object (the analysis precision is at Level 3 in FIG. 6).

Figure 12:
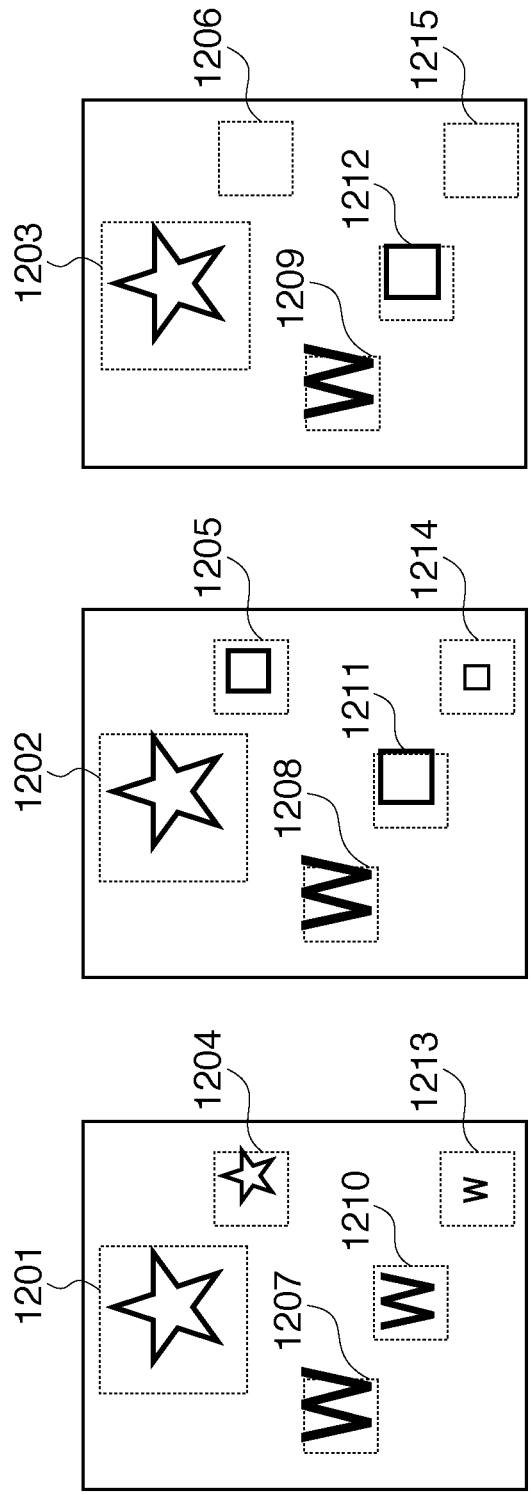
FIGS. 12A to 12C depict views illustrating example raster images displayed as a preview according to the second embodiment.

FIGS. 12A to 12C depict views illustrating examples of raster image data generated at the time of displaying a preview image of a job in accordance with the procedure of the second embodiment.

FIGS. 12A to 12C show raster image data generated respectively in the cases of "display size is large" (indicated by 303), "display size is medium" (indicated by 304), and "display size is small" (indicated by 305) in FIGS. 3A to 3C. Although FIGS. 12A to 12C are all shown in the same size for improved readability of the drawings as in the case of the first embodiment described above, their actual sizes correspond to FIGS. 9A to 9C, respectively.

(1) Case where the paths respectively corresponding to FIGS. 12A to 12C have a graphic attribute and an image size greater than or equal to a predetermined threshold value "10".

In the case of "display size is large", the process proceeds to step S26 since it is determined as YES in step S21 in FIG. 11, so a path shape is rendered in a raster image 1201 in FIG. 12A. In the case of "display size is medium", the process proceeds to step S26 since it is determined as YES in step S23, so a path shape is rendered in a raster image 1202 in FIG. 12B. In the case of "display size is small", the process proceeds to step S26 since it is determined as YES in step S23, so a path shape is rendered in a raster image 1203 in FIG. 12C.

(2) Case where the paths respectively corresponding to FIGS. 12A to 12C have a graphic attribute and an image size greater than a value "3" and less than the threshold value "10".

In the case of "display size is large", the process proceeds to step S26 since it is determined as YES in step S21, so a path shape is rendered in a raster image 1204 in FIG. 12A. In the case of "display size is medium", the process proceeds to step S27 since it is determined as NO in step S24, so a rectangle, which is a bounding box of the path, is rendered in a raster image 1205 in FIG. 12B. In the case of "display size is small", the process proceeds to step S28 since it is determined as YES in step S25, so no path is rendered in the raster image in FIG. 12C, as indicated by 1206.

(3) Case where the paths respectively corresponding to FIGS. 12A to 12C have a character attribute and an image size greater than or equal to a predetermined threshold value "10".

In the case of "display size is large", the process proceeds to step S26 since it is determined as YES in step S21, so a path shape "W" is rendered in a raster image 1207 in FIG. 12A. In the case of "display size is medium", the process proceeds to step S26 since it is determined as YES in step S22, so a path shape "W" is rendered in a raster image 1208 in FIG. 12B. In the case of "display size is small", the process proceeds to step S26 since it is determined YES in step S22, so a path shape "W" is rendered in a raster image 1209 in FIG. 12C.

(4) Case where the paths respectively corresponding to FIGS. 12A to 12C have a character attribute and an image size greater than a value "3" and less than the threshold value "10".

In the case of "display size is large", the process proceeds to step S26 since it is determined "YES" in step S21, so a path shape "W" is rendered in a raster image 1210 in FIG. 12A. In the case of "display size is medium", the process proceeds to step S27 since it is determined as NO in step S24, so a rectangle, which is a bounding box of the path, is rendered in a raster image 1211 in FIG. 12B. In the case of "display size is small", the process proceeds to step S27 since it is determined as NO in step S25, so a rectangle, which is a bounding box of the path, is rendered in a raster image 1212 in FIG. 12C.

(5) Case where the paths respectively corresponding to FIGS. 12A to 12C have a character attribute and an image size less than a value "3".

In the case of "display size is large", the process proceeds to step S26 since it is determined as YES in step S21, so a path shape "W" is rendered in a raster image 1213 in FIG. 12A. In the case of "display size is medium", the process proceeds to step S27 since it is determined as NO in step S24, so a rectangle, which is a bounding box of the path, is rendered in a raster image 1214 in FIG. 12B. In the case of "display size is small", the process proceeds to step S28 since it is determined as YES (less than "10") in step S25, so no path is rendered in the raster image in FIG. 12C, as indicated by 1215.

As described above, the second embodiment also achieves similar effects to those of the first embodiment described above. Specifically, analysis processing can be simplified (Level 2 of the analysis precision) or omitted (Level 3 of the analysis precision) depending on the output precision and the attribute of a path. Consequently, it is possible to increase the speed of the analysis processing performed by the job analyzer 101 while maintaining the visibility of a preview display screen, which enables quick generation and display of a preview image that reliably contains information that the user wants to confirm.

Third Embodiment

Next, in another embodiment of the present invention, processing is described in which a job analyzer 101 analyzes the color of an object included in a job. Note that the configuration of the job analyzer 101 and the outline of the processing are the same as described above in the first embodiment with reference to the flowchart of FIG. 5, and thus they have not been described here. Additionally, the construction of the control program executed by the printer is also similar to that described above in the first embodiment and thus has not been described. Here, three levels shown in FIG. 13 are prepared for analysis precision 203 switched by an analysis precision switching section 202 according to a third embodiment.

Figure 13:
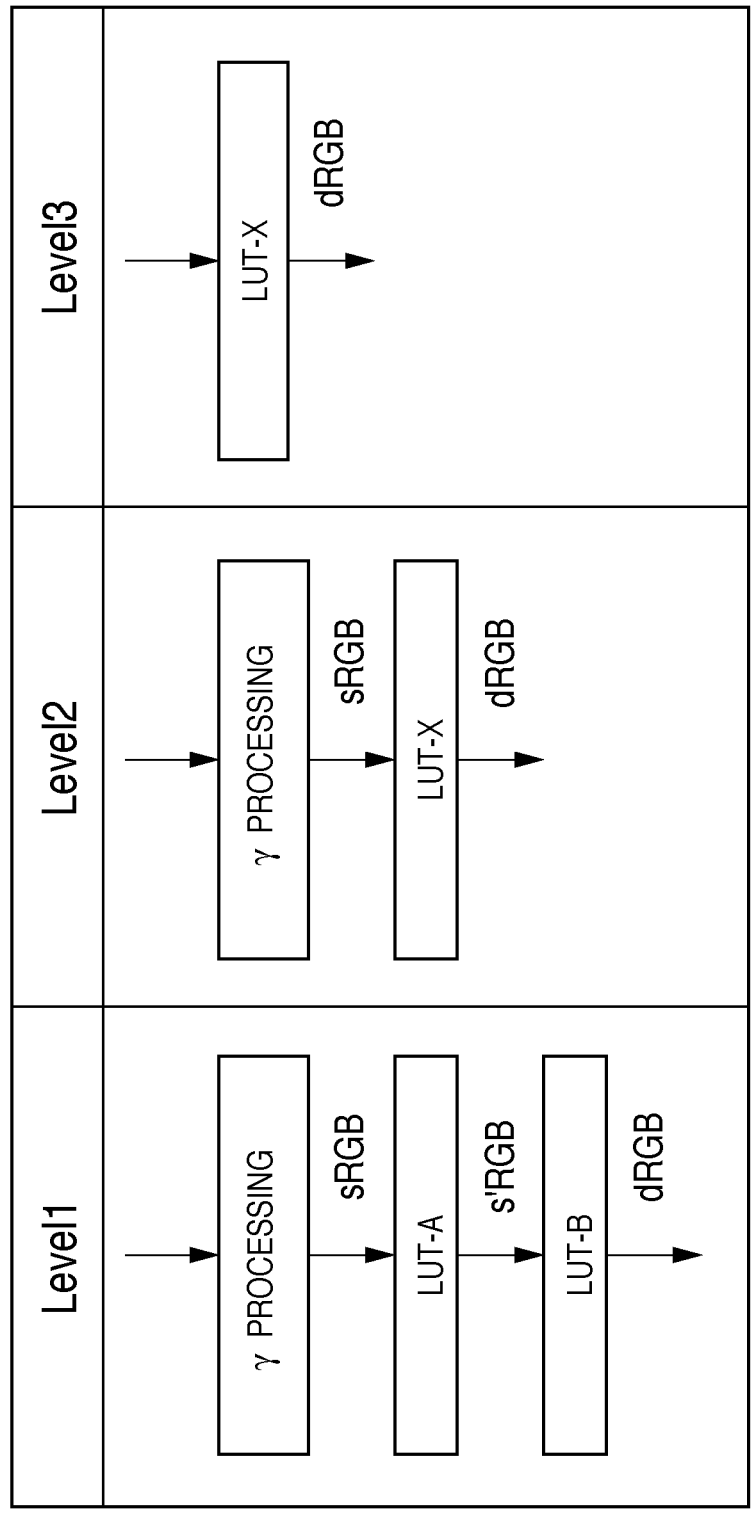
FIG. 13 is a diagram describing the precision of analysis by a job analyzer according to a third embodiment.

FIG. 13 is a diagram describing the degrees (levels) of the precision of analysis by the job analyzer 101 according to the third embodiment.

Level 1 is a level at which the job analyzer 101 first performs gamma processing on the color values of an object and then obtains RGB values for display on a device, using look-up tables A and B for color conversion processing. Level 2 is a level at which the job analyzer 101 performs gamma processing and obtains RGB values for display on a device, using a simplified look-up table X for color conversion processing. Level 3 is a level at which the job analyzer 101 does not perform gamma processing and obtains RGB values for display on a device, only using the simplified look-up table X for color conversion processing.

Hereinbelow, the processing performed by the job analyzer 101, in which the color values of an object included in a job are analyzed, is described with reference to the flowchart of FIG. 14.

Figure 14:
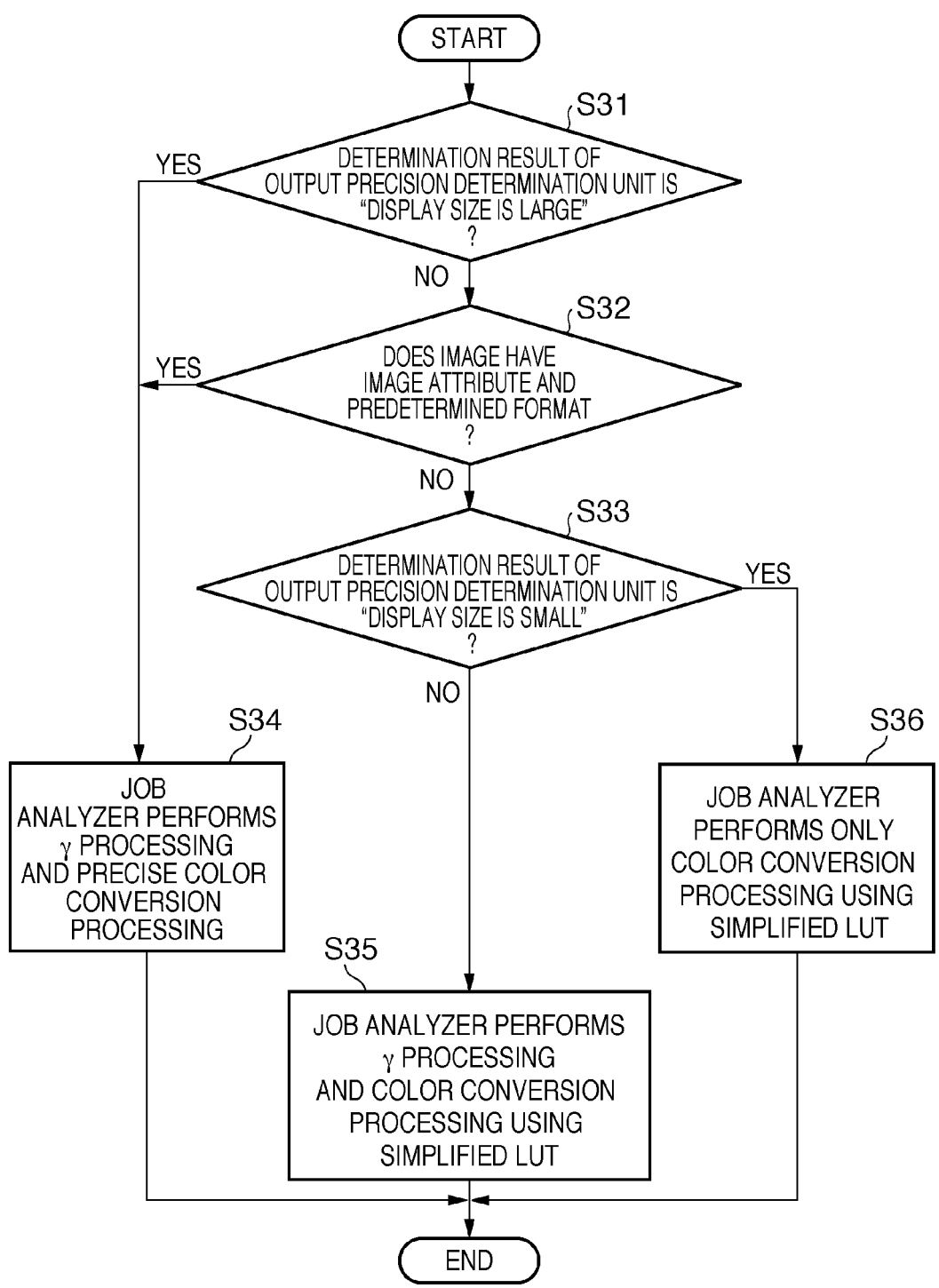
FIG. 14 is a flowchart describing processing performed by the job analyzer according to the third embodiment.

FIG. 14 is a flowchart describing the processing performed by the job analyzer 101 according to the third embodiment.

First, it is determined in step S31 whether or not the determination result obtained by the output precision determination section 201 in step S1 in FIG. 5 is "display size is large". If "display size is large", then the process proceeds to step S34, and otherwise, the process proceeds to step S32. In step S34, the job analyzer 101 performs gamma processing on the color values of the object, then performs color conversion processing, using the look-up tables A and B (the analysis precision is at Level 1), and ends the process. Meanwhile, in step S32, the job analyzer 101 determines whether or not the object extracted in step S3 in FIG. 5 has an image attribute and color values in a predetermined format. If the attribute of the object is an image attribute and the color values of the object are in the predetermined format, then the process proceeds to step S34, and otherwise, the process proceeds to step S33. In step S33, it is determined whether or not the determination result obtained by the output precision determination section 201 in step S1 in FIG. 5 is "display size is small". If so, then the process proceeds to step S36, and otherwise, the process proceeds to step S35. In step S35, the job analyzer 101 performs gamma processing on the color values of the object, then performs color conversion processing, using the simplified look-up table X (the analysis precision is at Level 2), and ends the process. Meanwhile, in step S36, the job analyzer 101 performs only color conversion processing on the color values of the object, using the simplified look-up table X, without performing gamma processing (the analysis precision is at Level 3) and ends the process.

Figure 15A:
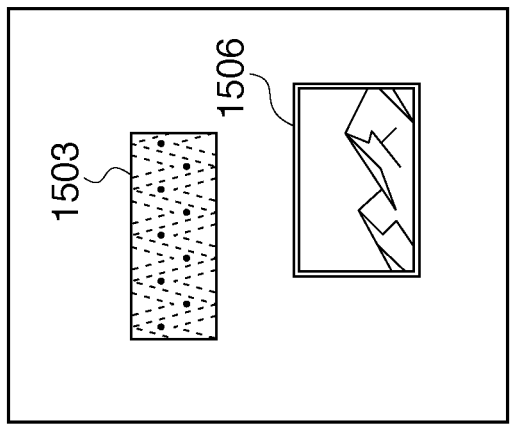
FIGS. 15A to 15C depict views illustrating example raster images displayed as a preview according to the third embodiment.
Figure 15B:
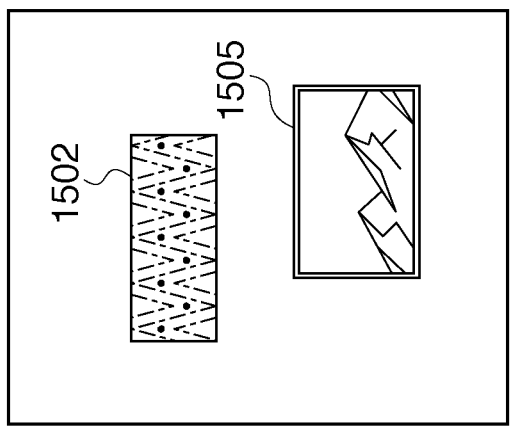
Figure 15C:
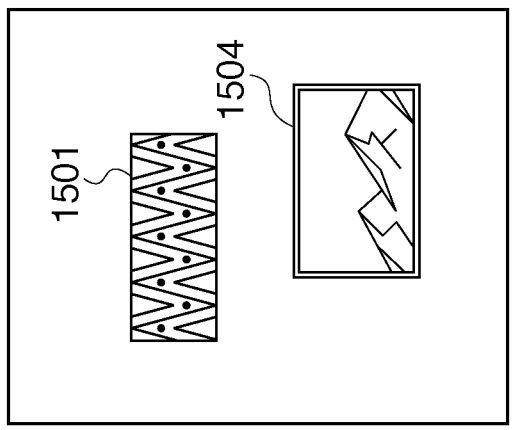

FIGS. 15A to 15C depict views illustrating examples of raster image data generated at the time of displaying a preview image of a job that includes an image, in accordance with the procedure of the third embodiment.

FIGS. 15A to 15C show raster image data generated respectively in the cases of "display size is large" (FIG. 15A), "display size is medium" (FIG. 15B), and "display size is small" (FIG. 15C). Although FIGS. 15A to 15C are all shown in the same size for improved readability of the drawings, their actual image sizes differ as shown in FIGS. 9A to 9C.

(1) Case where images respectively corresponding to FIGS. 15A to 15C have a graphic attribute and color values in a predetermined RGB format.

In the case of "display size is large", the process proceeds to step S34 since it is determined as YES in step S31 in FIG. 14, so an image that has undergone gamma processing and precise color conversion processing is rendered as a raster image 1501. In the case of "display size is medium", the process proceeds from steps S32 to S33 in FIG. 14 and then to step S35 since it is determined as NO in step S33, so an image that has undergone gamma processing and simplified color conversion processing is rendered as a raster image 1502. In the case of "display size is small", the process proceeds to step S36 since it is determined as YES in step S33, so an image that has undergone only simplified color conversion processing is rendered as a raster image 1503. Although both the raster images 1502 and 1503 are rendered in different tones from the raster image 1501 because they have not undergone precise color conversion processing, the influence of such a disadvantage is considered to be small because the display size is small.

(2) Case where images respectively corresponding to FIGS. 15A to 15C have an image attribute and color values in a predetermined RGB format.

In the case of "display size is large", the process proceeds to step S34 since it is determined as YES in step S31 in FIG. 14, so an image that has undergone gamma processing and precise color conversion processing is rendered as a raster image 1504. In the case of "display size is medium", the process proceeds to step S34 since it is determined as YES in step S32 in FIG. 14, so an image that has undergone gamma processing and precise color conversion processing is rendered as a raster image 1505. In the case of "display size is small", the process proceeds to step S34 since it is determined as YES in step S32 in FIG. 14, so an image that has undergone gamma processing and precise color conversion processing is rendered as a raster image 1506.

As described above, in the third embodiment, analysis processing can be simplified (Level 2 of the analysis precision) or omitted (Level 3 of the analysis precision) depending on the output precision and the attribute of a bitmapped image. Consequently, it is possible to increase the speed of the analysis processing performed by the job analyzer 101 while maintaining the visibility of a preview display screen, which enables quick generation and display of a preview image that reliably contains information that the user wants to confirm.

Fourth Embodiment

In a fourth embodiment, a case is described where a job analyzer 101 uses results of analysis processing performed before in order to analyze an object included in an input job. Note that the configuration of the job analyzer 101 and the outline of the processing are the same as described above in the first embodiment with reference to the flowchart of FIG. 5, and thus they have not been described here. Additionally, the construction of the control program executed by the printer is also similar to that described above in the first embodiment and thus has not been described.

Figure 16A:
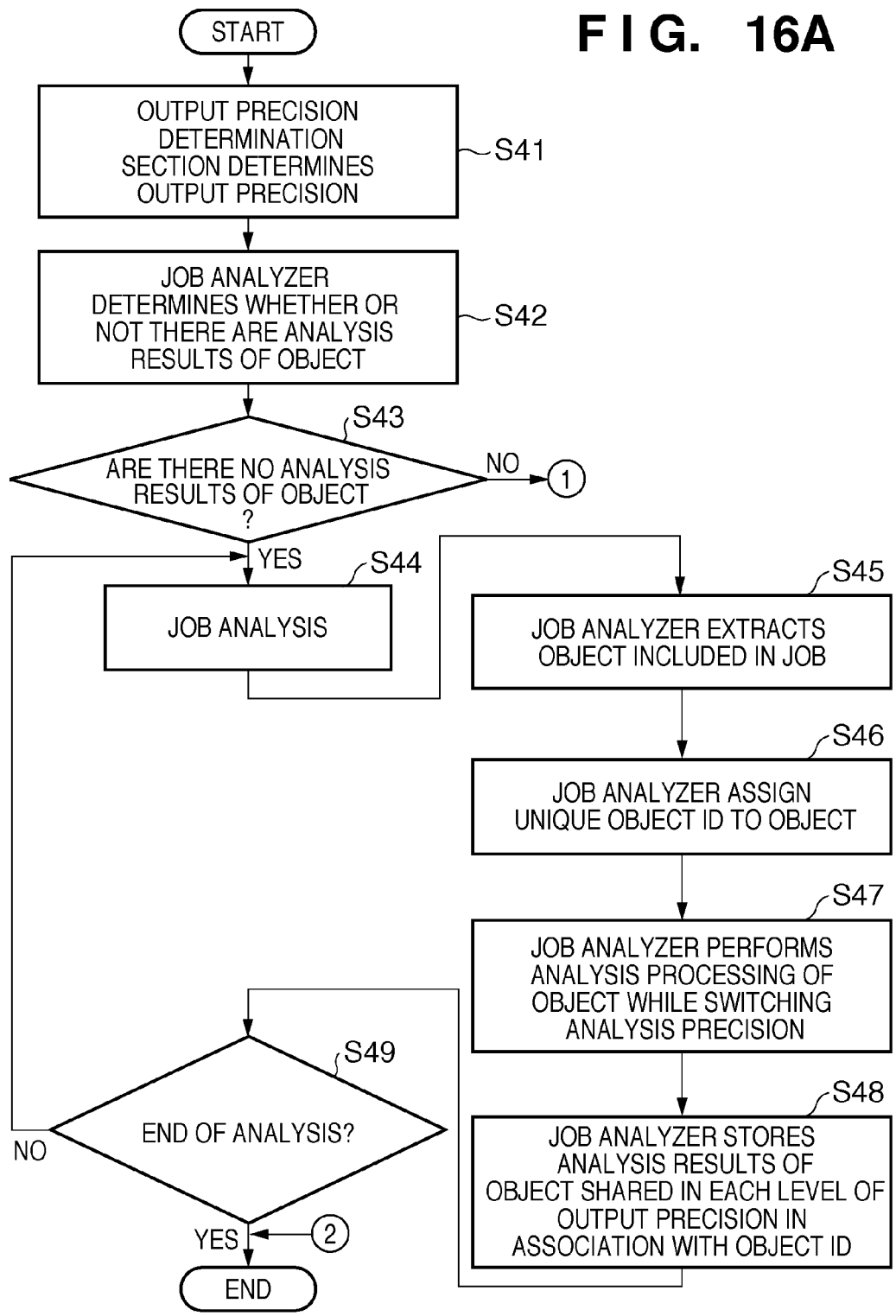
FIGS. 16A and 16B are flowcharts describing processing performed by a job analyzer according to a fourth embodiment.
Figure 16B:
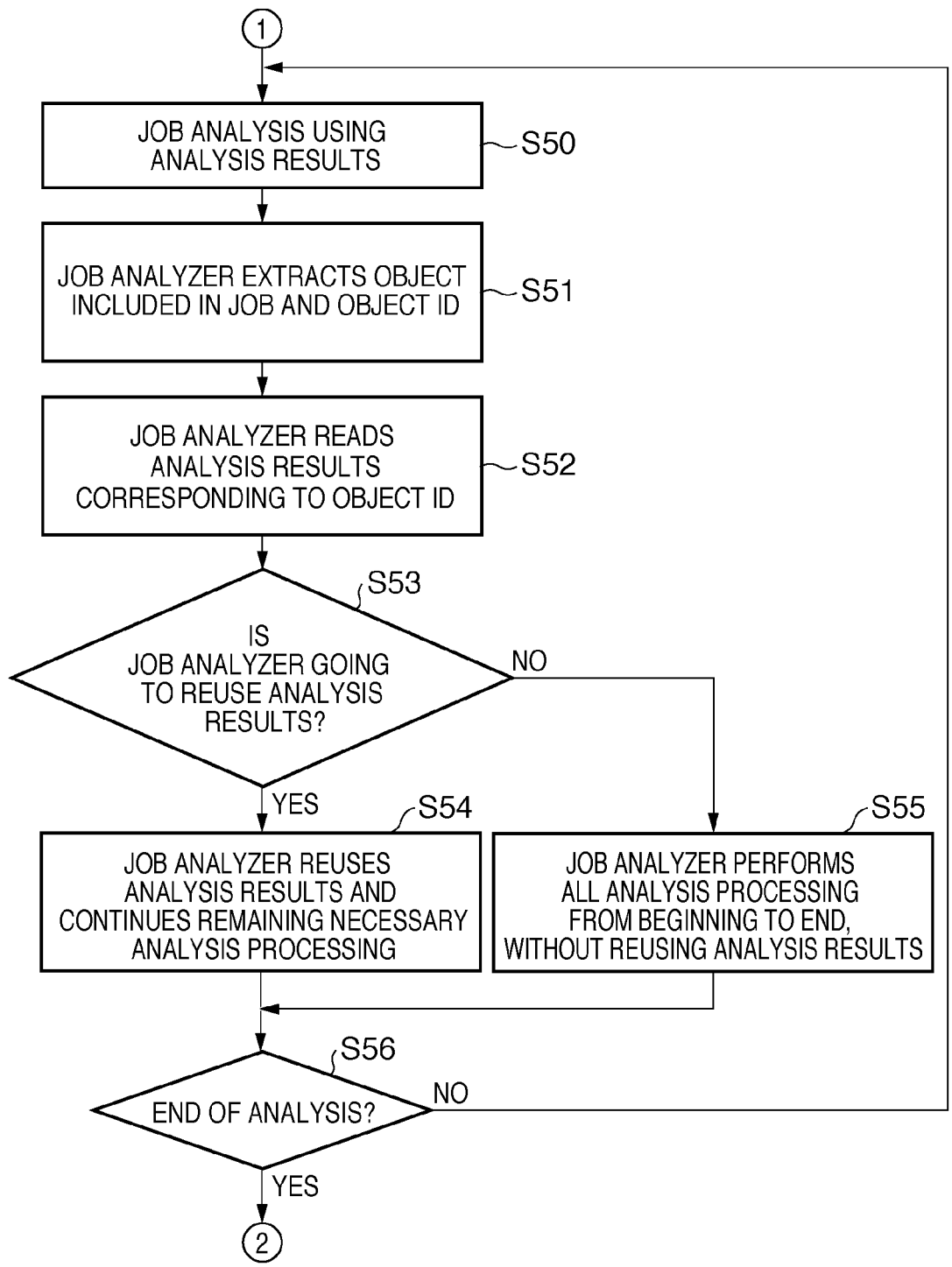

FIGS. 16A and 16B are flowcharts describing the processing performed by the job analyzer 101 according to the fourth embodiment.

In step S41, an output precision determination section 201 of the job analyzer 101 determines the output precision. Next, the process proceeds to step S42 where the job analyzer 101 determines whether or not there are analysis results of the object in the input job. If the job analyzer 101 determines in step S43 that there are no analysis results of the object, then the process proceeds to step S44, and if it is determined that there are analysis results of the object, then the process proceeds to step S50 (FIG. 16B).

First, a description is given of the processing from steps S44 to S49, which is performed when the job analyzer 101 has determined that there are no analysis results of the object. In step S44, the job analyzer 101 starts the analysis of a job. Next, in step S45, the job analyzer 101 extracts an object included in the input job. The process then proceeds to step S46 where the job analyzer 101 assigns a unique object ID to the object extracted in step S45. Then, the process proceeds to step S47 where the job analyzer 101 performs analysis processing of the extracted object while switching the degree of analysis precision. The switching of the degree of the analysis precision is as described above in the first to third embodiments and thus has not been described here. The process then proceeds to step S48 where the job analyzer 101 stores the analysis results of the object, which are shared in each level of output precision, in association with the above object ID. Then, the job analyzer 101 determines in step S49 whether or not the analysis of the job has been completed, and repeats the processing from steps S44 to S49 until the analysis is completed.

Next, a description is given of the processing performed with reference to FIG. 16B when the job analyzer 101 has determined in step S43 that there are analysis results of the object.

First, in step S50, the job analyzer 101 starts a job analysis using the analysis results. Next, the process proceeds to step S51 where the job analyzer 101 extracts an object included in the input job and the object ID attached to the object. The process then proceeds to step S52 where the job analyzer 101 reads the analysis results corresponding to the object ID. Then, the process proceeds to step S53 where the job analyzer 101 determines whether or not to reuse the analysis results that have been read in step S52. If it is determined to reuse the analysis results, then the process proceeds to step S54 where the job analyzer 101 reuses the read analysis results and continues remaining necessary analysis processing. The process then proceeds to step S56 where the job analyzer 101 determines whether or not the analysis of the input job has been completed, and repeats the processing from steps S50 to S56 until the analysis is completed. Meanwhile, if it is determined not to reuse the analysis results in step S53, then the process proceeds to step S55 where the job analyzer 101 performs all analysis processing from beginning to end without reusing the analysis results that have been read in step S52, and the process proceeds to step S56.

Figure 17:
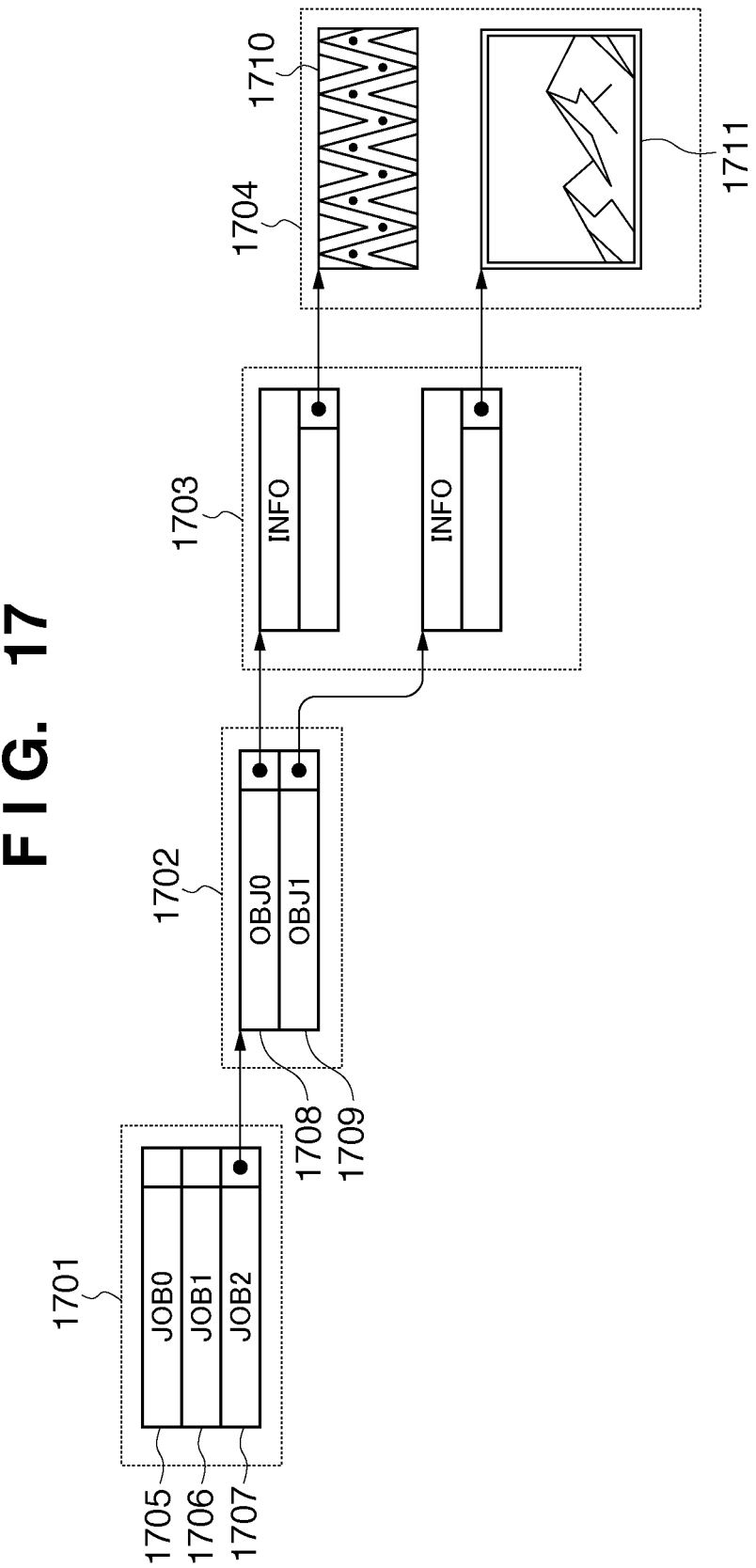
FIG. 17 is a diagram describing an example of analysis results of an input job according to the fourth embodiment.

FIG. 17 is a diagram describing an example data structure showing analysis results of an input job according to the fourth embodiment.

Reference numeral 1701 denotes a job ID used to identify an input job, and there are three jobs (JOB0, JOB1, and JOB2) in the present example. A job (JOB2) 1707 includes a link to where the analysis results of the job 1707 have been stored. On the other hand, jobs (JOB0 and JOB1) 1705 and 1706 include no link, which indicates that no analysis results are stored for the jobs 1705 and 1706. Reference numeral 1702 denotes an object ID used to identify an object, and the job 1707 includes two objects (OBJ0 and OBJ1) 1708 and 1709 in the present example. The objects 1708 and 1709 both include a link to an area 1703 where information about analysis results is stored. Reference numeral 1704 denotes the substance of data associated with the analysis results.

Next, a description is given of an example where results of analysis processing performed in the case of "display size is medium" according to the fourth embodiment are stored.

Reference numeral 1710 denotes an image having a graphic attribute and having undergone gamma processing, which can be shared in each level of output precision. Since the analysis results have undergone only gamma processing, it is necessary in the analysis processing of step S54 in FIG. 16B to perform color conversion processing using a look-up table. Meanwhile, reference numeral 1711 denotes an image having an image attribute and having undergone gamma processing, which will be shared in each level of output precision, and precise color conversion processing. Accordingly, the analysis results thus obtained can be used as is at any output precision. The area 1703 stores information (INFO) attached to analysis results and, as described above, includes a link to information indicating how far the analysis has progressed or to actual data indicating analysis results.

As described above, according to the fourth embodiment, it is possible to store the results of analysis processing performed before and to use the analysis results for subsequent analysis processing. This increases the speed of the analysis processing performed by the job analyzer 101 while maintaining the visibility of a preview display screen, even if the output precision may change, which enables quick generation and display of a preview image that reliably contains information that the user wants to confirm.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium)

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-204135, filed Sep. 3, 2009, which is hereby incorporated by reference herein in its entirety.

What is claimed is:

1. An image processing apparatus comprising:
 a display unit configured to display a preview image in a first display size and in a second display size, the preview image displayed in the first display size being enlarged compared with the preview image displayed in the second display size;
 a storage unit configured to store image data including a first object which has a first attribute and a second object which has a second attribute being different from the first object;
 an analysis unit configured to, in a case that the preview image including the first object and the second object is displayed in the first display size, analyze the first object and the second object with a first analysis precision to generate preview image data for displaying the preview image in the first display size, and in a case that the preview image including the first object and the second object is displayed in the second display size, analyze the first object with the first analysis precision and the second object with a second analysis precision to generate preview image data for displaying the preview image in the second display size, a degree of the second analysis precision being lower than a degree of the first analysis precision; and a display control unit configured to control the display unit to display the preview image based on the preview image data generated by the analysis unit.

2. The image processing apparatus according to claim 1, wherein the first attribute is a character attribute, and wherein the second attribute is a graphic attribute.

3. The image processing apparatus according to claim 1, wherein the degree of the first analysis precision is a precision in analyzing an edge of an object and wherein the second analysis precision is a precision in analyzing an edge of a bounding box of the object.

4. The image processing apparatus according to claim 1, further comprising:

a holding unit configured to hold analysis results of the first object and the second object analyzed by the analysis unit, wherein, if there are analysis results of the first object and the second object stored in the holding unit, the analysis unit uses the held analysis results to analyze new objects.

5. The image processing apparatus according to claim 1, further comprising a specifying unit configured to specify a display size of the preview image to be displayed based on the preview image data.

6. A method of controlling an image processing apparatus comprising a display unit configured to display a preview image in a first display size and in a second display size, the preview image displayed in the first display size being enlarged compared with the preview image displayed in the second display size, and a storage unit configured to store image data including a first object which has a first attribute and a second object which has a second attribute being different from the first object, comprising:

an analysis step of, in a case the preview image including the first object and the second object is displayed in the first display size, analyzing the first object and the second object with a first analysis precision to generate preview image data for displaying the preview image in the first display size, and in a case that the preview image including the first object and the second object is displayed in the second display size, analyzing the first object with the first analysis precision and the second object with a second analysis precision to generate preview image data for displaying the preview image in the second display size, a degree of the second analysis precision being lower than a degree of the first analysis precision; and a display control step of controlling the display unit to display the preview image based on the preview image data generated in the analysis step.

7. A non-transitory computer readable storage medium storing a program for causing a computer to execute a method of controlling an image processing apparatus comprising a display unit configured to display a preview image in a first display size and in a second display size, the preview image displayed in the first display size being enlarged compared with the preview image displayed in the second display size, and a storage unit configured to store image data including a first object which has a first attribute and a second object which has a second attribute being different from the first object, the method comprising:

an analysis step of, in a case that the preview image including the first object and the second object is displayed in the first display size, analyzing the first object and the second object with a first analysis precision to generate preview image data for displaying the preview image in the first display size, and in a case that the preview image including the first object and the second object is displayed in the second display size, analyzing the first object with the first analysis precision and the second object with a second analysis precision to generate preview image data for displaying the preview image in the second display size, a degree of the second analysis precision being lower than a degree of the first analysis precision; and a display control step of controlling the display unit to display the preview image based on the preview image data generated in the analysis.

* * * * *